3,369,800
GAS-LIQUID CONTACT APPARATUS
Takeichiro Takamatsu, Kyoto-shi, Shiro Nakai, Hirakata-shi, and Teizo Miyauchi, Nara-shi, Japan, assignors to Kimura Entetsu Kagaku Kikai Co., Ltd., Amagasaki-shi, Japan, a corporation of Japan
Filed July 10, 1964, Ser. No. 381,821
Claims priority, application Japan, July 19, 1963, 38/38,908
9 Claims. (Cl. 261—88)

ABSTRACT OF THE DISCLOSURE

A gas-liquid cross flow contact apparatus having a plurality of rotatable, vertically spaced apart, porous spiral discs axially aligned in a vertical housing, in which a liquid is injected from the center outwardly through said spiral discs by centrifugal forces thereby promoting a cross-flow contact with a gas passing upwardly through the housing whereby the contacting efficiency is greatly improved by the increased formation of liquid droplets.

---

This invention relates to gas-liquid contact apparatus.

More particularly, the present invention relates to a gas-liquid contact apparatus, which is characterized by forming a contact of gas of liquid in spiral discs, passing the axis of rotation through the central part of the cylindrical framework so that gas may pass from the lower part to the upper part, establishing firmly multi-stage porous spiral discs with the axis as a center, provided with the inlet for liquid at the central part of the spiral disc on the top stage, provided with a receiving plate fixed to the inside wall of the cylindrical framework at the lower part of the circumference of the spiral disc on each stage, establishing the connecting pipe having an opening at the central part of the spiral disc just below the said receiving plate, and having the liquid outlet for the receiving plate on the lowest stage.

The object of the present invention is to increase efficiency of contact by adopting partly the cross-current contact method, which is said to be excellent in efficiency of contact, for the contact of gas and liquid, and by forming counter current contact in whole.

The essential point of the present invention is the construction of porous spiral discs. If, instead of porous spiral discs, concentric and multiple porous cylinders are used, in sending liquid through openings from inside cylinders to outside cylinders, liquid stagnates in the cylindrical framework and the passage of gas is prevented.

Figure 1:
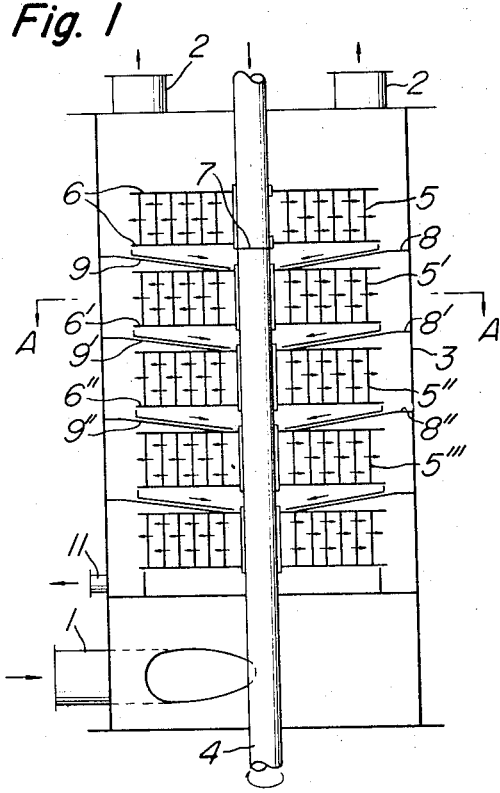
Figure 2:
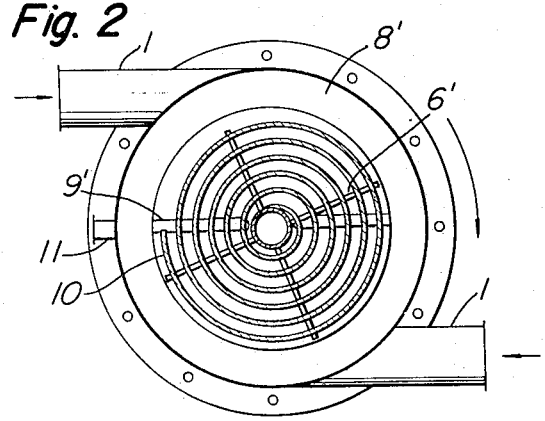

The accompanying drawing illustrates an example of the present invention. FIGURE 1 is a vertical and side view of an embodiment of the invention and FIGURE 2 is the A—A section of FIGURE 1.

The following is an explanation of the drawing. The axis of rotation 4 is passed through the central part of the cylindrical framework 3 provided with the inlet for gas 1 tangentially on the side of the lower part and the outlet for gas 2 at the upper part. To this axis 4, porous multi-stage spiral discs 5, 5' and 5", provided with an inside flange 10, which is maintained by supporters 6, 6' and 6", are fixed. In the part of the axis of rotation to which the center of the spiral disc 5 on the top stage is adjacent a hole is made, and when liquid is supplied from the upper part of the axis of rotation, it reaches the inside of the spiral disc 5. 7 is a plate for preventing the passage of liquid through the inside of the cylindrical framework in order to fulfill the function as mentioned above. The inside wall of the cylindrical framework 3 outside spiral discs 5, 5' and 5" is provided with receiving plates 8, 8' and 8", from which some connecting pipes having openings in such a way that liquid does not flow down directly to the central part of spiral discs 5' and 5" stretch out. 11 is a place for getting out liquid, established at the lower part of a spiral disc on the lowest stage. When liquid is supplied from the opening of the top of the axis of rotation 4 and gas is supplied from the inlet for gas after the axis of rotation 4 has been caused to rotate, namely, after spiral discs 5, 5' and 5" united with the axis of rotation have been caused to rotate, liquid is conveyed from the opening of the axis of rotation 4 to the central part of the spiral disc on the top stage and after that it moves away from the central part by the action of centrifugal force. Since many small holes are made in the spiral disc 5, liquid moves to the outside wall of the spiral disc 5 successively through those small holes in the form of a small amount of water in a cylindric shape and finally it flows toward the inside wall of the cylindrical framework 3. Thus the liquid which has flowed toward the inside wall of the cylindrical framework 3 is brought together to a receiving plate and then is sent from the connecting pipe 9 to the central part of the spiral disc 5' on the lower stage, and the same action as mentioned above is repeated, and finally it is gotten out from the outlet for liquid. On the other hand, the gas supplied from the inlet for gas 1 goes up through the chinks of multi-stage spiral discs 5, 5' and 5" from downward, contacts crosswise with numberless liquids in the form of a small amount of water in a small cylindric shape, and an excellent gas-liquid contact effect is produced, and taken all together, this is a complete counter current contact. Therefore, an impellent force which gas and liquid have can be fully utilized, and efficiency of contact becomes very good. Thus the gas which has completed contact is gotten out from the outlet for gas 2 and liquid becomes inseparable by mixing at the time when openings are closed with impurities, apart from the time of ordinary operation. Therefore, operation in this case must be stopped at once. For this reason, in the present invention porous spiral discs are used instead of concentric and multiple porous cylinders. In this way, although openings are closed, liquid moves to the outside end of a spiral disc along its inside wall by the action of centrifugal force and then flows forth. Therefore, although operation is not stopped at once, contact effect may be maintained to some extent. Accordingly, it is almost unnecessary to change and make the diameter and number of openings according to the viscosity and temperature of liquid in consideration of the purpose of use. Moreover, the present invention is characterized by the possibility of the manufacture of large numbers because of its adaptability.

The following are the reasons for the use of spiral discs 5, 5' and 5", which has the action effect as mentioned above.

In the case where groups of openings of spiral discs 5, 5' and 5" have been closed with impurities in liquid and as the result liquid has accumulated to some extent in the cylindrical framework, liquid moves away from the central part of the framework along the inside wall successively by the action of centrifugal force and finally flows from the opening of the end of a spiral disc toward the inside wall of the cylindrical framework 3. Thus, although groups of openings are closed, it is not necessary to stop the operation of this apparatus at once. And to some extent contact effect may be expected even when the operation of this apparatus has been continued. If multiple cylinders are used instead of spiral discs, liquid is brought together and falls in drops, in the case where groups of openings are closed with liquid. Therefore, liquid is mixed with gas and the present invention will mean little.

As mentioned above, since efficiency of contact in the present invention may be increased by forming a contact of many small streams of liquid in forced gas by force and crossly and since the present invention consists of multi-stage spiral discs and the counter current contact of gas is formed all over, the present invention is characterized by the possibility of the full utilization of an impellent force of gas and liquid.

What is claimed is:

1. A gas-liquid contact apparatus comprising a housing, a vertical rotatable shaft extending within said housing, a plurality of vertically spaced apart discs, mounted on the shaft for rotation therewith, each such disc comprising a vertically extending porous wall wound in a horizontal spiral and mounted on a lower horizontal support, collecting means mounted on said housing and extending radially inwardly intermediate respective pairs of said spiral discs and adapted to lead such liquid to the center of the disc below, means for feeding liquid to the center of the top disc and means for removing liquid from the housing as it falls from the periphery of the lowest disc, said housing having a gas inlet at the bottom and a gas outlet at the top of said housing.

2. The apparatus according to claim 1 wherein each disc further comprises an upper horizontal member mounted on top of the associated spiral wall.

3. The apparatus according to claim 2 wherein conduits are mounted on the gutters adapted to lead the liquid toward the center where it falls into the center of the disc below.

4. The apparatus according to claim 3 wherein the gas inlet is at least one tangentially disposed conduit connected to the housing below the bottom disc.

5. The apparatus according to claim 3 wherein the gas outlet comprises at least one conduit extending vertically from the top of the housing.

6. The apparatus according to claim 1 wherein the means for collecting liquid each comprise an annular gutter inwardly extending from the wall of the housing below the periphery of the respective disc.

7. The apparatus according to claim 1 wherein the housing is cylindrical, having its axis coincident with that of the shaft.

8. The apparatus according to claim 1 wherein at least the upper part of said shaft is hollow, a hole being formed in the wall of the shaft to allow liquid supplied to the shaft to flow into the center of the top disc.

9. A gas-liquid contact apparatus comprising a cylindrical housing having means affording the entrance and exit of a gas, a vertical rotatable shaft extending within said housing, a plurality of vertically spaced spiral discs mounted on said shaft, each of said discs comprising a spiral vertically extending porous wall wound in a horizontal spiral and mounted on a lower horizontal support, collecting means mounted on said housing and extending radially inwardly intermediate respective pairs of said spiral discs, said shaft having a hollow portion, means defining an opening in said hollow portion adapted to deliver a liquid to the center of the upper spiral disc and means permitting discharge of the liquid from said housing, whereby a gas passing through said housing contacts a liquid in a cross-flowing manner as said liquid passes radially outwardly through said spiral disc and said liquid is gravimetrically collected and distributed to successively lower discs.

References Cited

UNITED STATES PATENTS

| 199,450 | 1/1887 | Kirkham et al. | 261—92 |
| 1,051,016 | 1/1913 | Schmidt | 261—88 |
| 3,151,043 | 9/1964 | Beattie et al. | 261—89 X |

FOREIGN PATENTS

| 463,785 | 3/1950 | Canada. |
| 694,222 | 9/1964 | Canada. |
| 859,097 | 1/1961 | Great Britain. |

FRANK W. LUTTER, *Primary Examiner.*

HARRY B. THORNTON, *Examiner.*

E. H. RENNER, *Assistant Examiner.*